J. SZOTÁK.
HEATER.
APPLICATION FILED JAN. 28, 1915. RENEWED NOV. 15, 1915.

1,172,404.  Patented Feb. 22, 1916.

Witnesses:
Fred Roeger
Aladar Hamburger

Inventor
John Szoták
By his Attorney Alexander Irues

UNITED STATES PATENT OFFICE.

JOHN SZOTÁK, OF ELIZABETH, NEW JERSEY.

HEATER.

1,172,404.  Specification of Letters Patent.  Patented Feb. 22, 1916.

Application filed January 28, 1915, Serial No. 4,886. Renewed November 15, 1915. Serial No. 61,730.

*To all whom it may concern:*

Be it known that I, JOHN SZOTÁK, a subject of the King of Hungary, residing at Elizabeth, in the county of Hudson and State of New Jersey, have invented new and useful Improvements in Heaters, of which the following is a specification.

This invention relates to heaters for bottles, preserve cans, pots, pans and the like and has as its principal object to provide a device by means of which food-stuffs may be heated to a degree required for the consumption of said food stuffs, in their original containers.

A further object of my invention is to provide a heating device which eliminates the peril of conflagrations.

A still further object of my invention is to provide heating means readily accessible at all places and times where and when the usual means of heating are not available.

A final object of my invention is to provide a device of this character which is simple in construction, practical in use and can be manufactured at a comparatively low cost.

Figure 1:
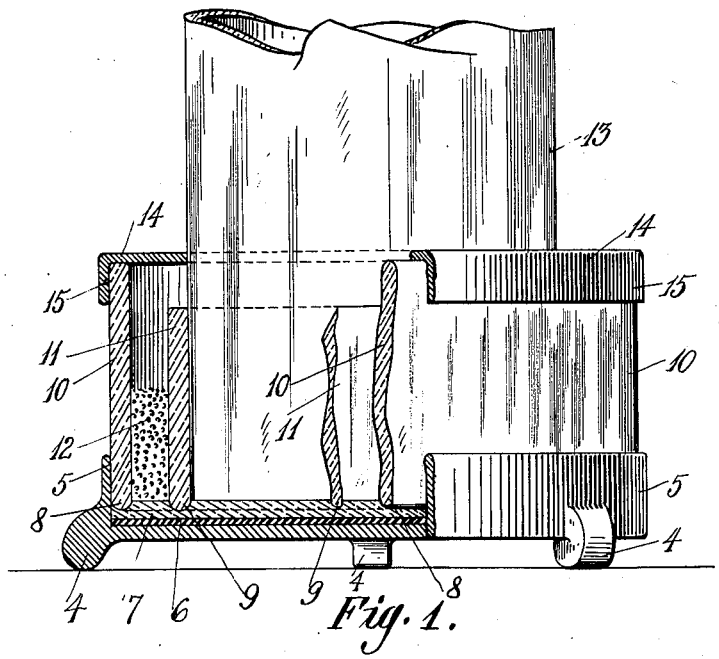
Figure 2:
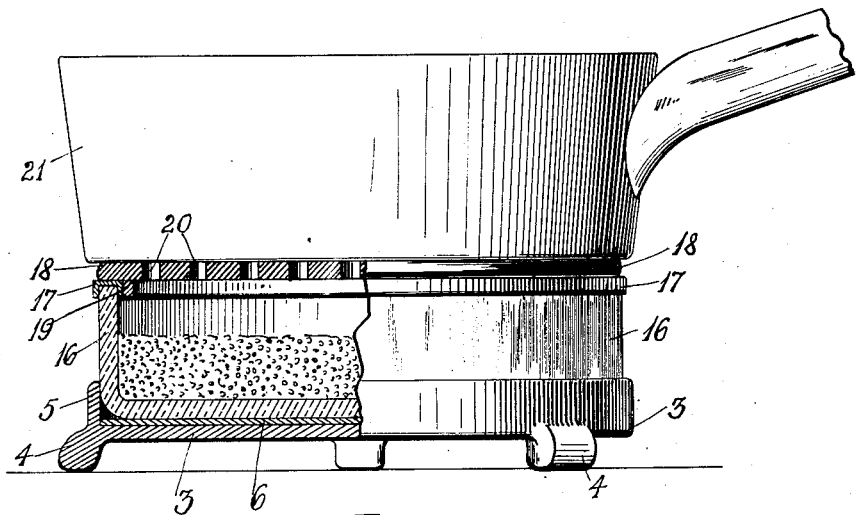

Reference will now be had to the accompanying drawing in which:

Figure 1 is a partly sectional, partly elevational view of one form of my device and Fig. 2 is a similar view of another form of same.

The same part is designated by the same reference character in the separate views.

Referring more particularly to the drawing, 3 is a circular base preferably made of cast metal, having legs 4 and a cylindrical wall 5. An asbestos disk 6 is placed on top of the base 3 as an isolator. On top of the asbestos disk 6 I place, in the form of my device shown in Fig. 1, a glass disk 7 in the upper surface of which two annular grooves are formed, the outer one, 8, close to the wall 5 and the inner one, 9, at a suitable distance thereof. Glass cylinders 10 and 11 are inserted, with their lower edges, into the grooves 8 and 9, respectively, and the space thus formed between the two cylinders is partly filled with a substance 12 such as $CaOH+HC_2$ adapted to develop intense heat on the addition of water thereto, for which the remaining space between the cylinders 10 and 11 is reserved. The heat thus developed will be communicated to the bottle, can or the like, designated by 13, placed on the glass disk 7, inside the cylinder 11. On top of the cylinder 10 I place a cover 14, having an annular shape and downwardly projecting flange 15 overlapping the cylinder 10 at its outside.

In the other form of my invention, shown in Fig. 2, I place the thermal substance 12 into a glass dish 16 on top of the asbestos plate 6. The top-edges of the dish 16 are covered by a metal rim 17 on top of which I place a circular metal plate 18 provided with a downwardly projecting annular flange 19 at some distance from its periphery, said flange 19 fitting closely into the top opening of the dish 16 and serving to maintain the plate 18 in position thereon. The plate 18 has also a number of holes 20 provided in it for the purpose of admitting the heat to the cooking utensil 21 placed on top of it.

It will be seen that in either form of my invention its component parts may easily be separated from each other, for the purpose of removing the thermal substance after each use and for general cleaning purposes.

I claim:

1. A heater for bottles, cans and cooking utensils, comprising, in combination, a metal base, a heat isolator placed on top of said base, a glass container adapted to be filled with a substance developing intense heat on contact with water, placed on said heat isolator, said container being adapted to communicate the heat developed therein to other containers suitably placed in respect to said first mentioned container.

2. A heater for bottles, cans and the like, comprising, in combination, a metal base, an isolator placed on said base, a glass disk placed on said isolator, having circular grooves formed in its upper surface, glass cylinders placed on said glass disk having their lower edges engaged by said grooves, the space formed between said glass cylinders being partly filled with a substance adapted to develop intense heat on contact with water, and a metal covering ring confining said space formed between said cylinders, substantially as and for the purpose set forth.

JOHN SZOTÁK.

Witnesses:
ALEXANDER DENCS,
ALEXANDER MIHALKOWITZ.